March 23, 1937.　　　　　R. I. BATES　　　　　2,074,355

SHOCK ABSORBER

Filed June 15, 1936

Inventor
RALPH I. BATES
By Spencer, Hardman and Fehr
Attorneys

Patented Mar. 23, 1937

2,074,355

UNITED STATES PATENT OFFICE 2,074,355

SHOCK ABSORBER

Ralph I. Bates, Dayton, Ohio, assignor to General Motors Corporation, Detroit, Mich., a corporation of Delaware Application June 15, 1936, Serial No. 85,289

5 Claims. (Cl. 188—88)

This invention relates to improvements in hydraulic shock absorbers.

It is among the objects of the present invention to provide a hydraulic shock absorber with means that will reduce noise caused by reciprocation of the shock absorber piston.

A further object of the present invention is to provide a hydraulic shock absorber with a cushioning element between the piston and its actuator whereby impact noises, caused by rotation of the piston as it is being reciprocated, are substantially eliminated.

Further objects and advantages of the present invention will be apparent from the following description, reference being had to the accompanying drawing, wherein a preferred embodiment of the present invention is clearly shown.

Figure 1:
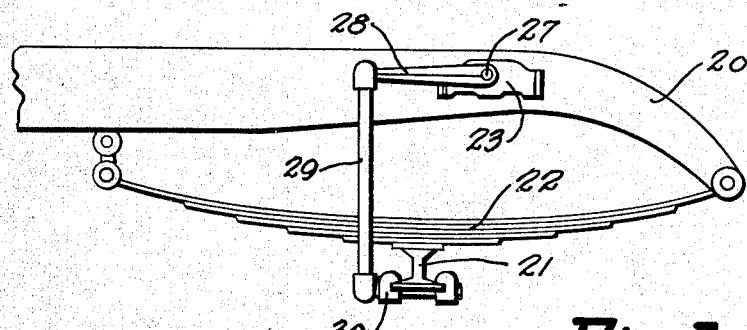
Fig. 1 is a fragmentary side view of a vehicle chassis, with wheels removed, a shock absorber equipped with the present invention being shown attached thereto.

Referring to the drawing, the numeral 20 designates the frame of the vehicle which is supported upon the vehicle axle 21 by springs 22. The shock absorber, designated as a whole by the numeral 23, comprises a casing 24 which is attached to the vehicle frame in any suitable manner. This casing provides a cylinder portion 25, closed at both ends by the cylinder heads 26. A transverse rocker-shaft 27 is journalled in the casing 24, one end of said shaft extending to the exterior thereof and having the shock absorber operating arm 28 secured thereto. The free end of this arm 28 has one end of the link 29 attached to it, the other end of the link being secured to the vehicle axle 21 by the clamp 30.

Within the casing 24 shaft 27 has an operating cam or lever 31 secured thereto so that said cam will oscillate with the shaft. This cam 31 extends into a rectangularly shaped recess 32 provided in the piston 33 reciprocably carried within the cylinder portion 25 of the casing. This piston may be of the standard one-piece construction, or of the construction as shown in the drawing, in which the piston comprises two separate portions 33a and 33b secured together by two studs 34 and 35. Stud 34 slidably extends through a channel in piston portion 33a and threadedly engages piston portion 33b. A spring 34a is interposed between the head of stud 34 and piston portion 33a. Stud 35, on the contrary, extends slidably through a passage in piston portion 33b and is threadedly received by an aligned passage in piston portion 33a. Like stud 34, this stud 35 has a spring 35a interposed between its head and the piston portion 33b, both springs 34a and 35a urging the piston portions 33a and 33b toward each other, or more specifically toward the operating cam 31 which, as has been described, extends into the recess 32 provided in the piston intermediate its ends. To provide for longer wear, each piston portion has a wear-piece or button 40 made of wear-resisting material, said buttons being engaged by the operating cam 31. Each button comprises a head portion lying within the confines of the recess 32 and a shank portion extending into a bored-out opening in a piston portion.

Each piston portion 33a and 33b has a through passage providing for the transfer of fluid from one side of the piston to the other as the piston is reciprocated and suitable fluid flow control devices regulate this fluid flow. Inasmuch as these parts of the shock absorber do not enter into the invention, no further description thereof will be made.

Figure 3:
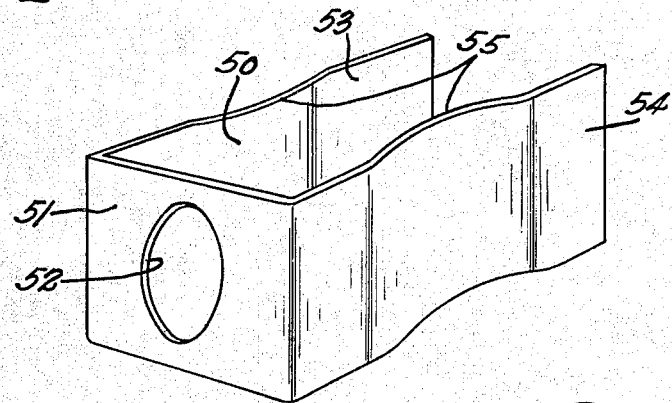
Fig. 3 is a perspective view of the silencing element.

When shock absorbers as shown in the accompanying drawing are produced commercially in great numbers it is practically impossible to obtain perfect alignment between the contacting surfaces of the operating cam 31 and the piston wear-pieces or buttons 40. Very often high spots will be present in one or the other of these parts and these high spots will cause the piston to rotate as the cam exerts pressure upon one or the other wear-piece or button 40 to reciprocate the piston. Rotation of the piston causes the longer or side walls of the recessed piston parts to strike the operating cam 31, such impact resulting in a very perceptible and objectionable noise which may readily be heard in a vehicle, the other parts of which are operating substantially without noise. To eliminate this impact between the piston and its operating cam, the present invention provides a cushioning element 50 in the form of a U-shaped blade spring, the base or body portion 51 thereof having an opening 52 through which the stud of a wear-piece or button 40 extends for the purpose of securing the cushioning element within the piston by causing the head of said button to clamp the element upon the piston. The cushioning element has two parallel arm portions 53 and 54 each of which, when said element is secured in its place on the piston, extends into the space between a wall of the recess 32 of the piston and the adjacent side of the operating cam 31. As shown in Fig. 3, each arm has an inwardly curved portion 55, intermediate the end of the arm and the body portion 51, the said curved portion having a line engagement with the adjacent side of the operating cam. The two portions of the arm on each side of the curved portion are substantially flat and engage the adjacent wall of the recess 32. The resiliency of arms 53 and 54 and their contact with adjacent surfaces of the piston recess wall and operating cam will naturally resist rotation of the piston and thus the tendency of noises produced by this impact due to such rotation is substantially eliminated.

Figure 2:
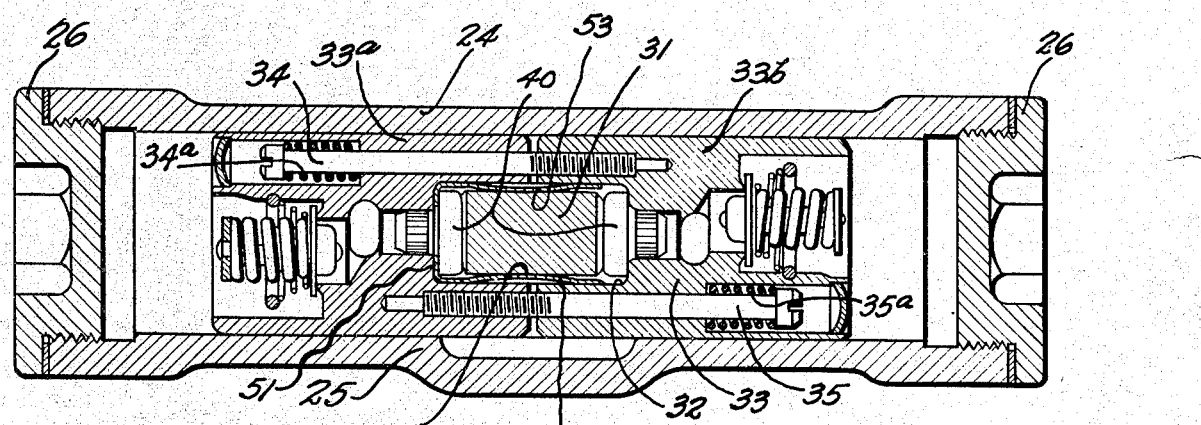
Fig. 2 is a longitudinal sectional view taken through the center of the shock absorber cylinder showing the silencing element of the present invention applied to the shock absorber piston.

Thus when the axle 21 is thrust upwardly toward the vehicle frame 20, due to the striking of an obstruction by the roadwheels, link 29 and arm 28 will rotate shaft 27 and its operating cam 31 clockwise or toward the left as regards Fig. 2 and consequently cam 31 will exert pressure upon the wear-piece or button 40 in piston portion 33a, moving it toward the left to exert a pressure upon the fluid in the left end of the cylinder 25. If a high spot on either the cam 31 or said button 40 exists, then this pressure of the cam on said button will tend to rotate the piston, which rotation, however, is resisted and substantially eliminated due to the presence of the peculiarly shaped arms 53 and 54 of the cushioning element 50 being interposed between adjacent surfaces of the cam and piston. This same is true if the piston is moved toward the right by the counter-clockwise rotation of the cam 31 in response to rebounding movement of the axle 21 from frame 20 under the influence of the vehicle springs 22.

From this it may be seen that the present invention provides for a quietly operating shock absorber by substantially preventing rotation of the piston caused by imperfectly machined cooperating surfaces, which imperfections are practically unavoidable, especially when devices of this kind are produced commercially and in great numbers.

While the embodiment of the present invention as herein disclosed constitutes a preferred form, it is to be understood that other forms might be produced, all coming within the scope of the claims which follow.

What is claimed is as follows:

1. In a shock absorber having a casing providing a cylinder, the combination with an operating cam oscillatably supported in the casing, of a piston in said cylinder, having a recess into which said operating cam extends, said piston being adapted to be reciprocated by said cam; and yieldable means interposed between and engaging the cam and piston for resisting rotation of the piston.

2. In a shock absorber having a casing providing a cylinder, the combination with an operating cam oscillatably supported in the casing, of a piston in said cylinder, having a recess into which said operating cam extends, said piston being adapted to be reciprocated by said cam; and a spring member having portions extending between and engaging the two opposite sides of the cam and the adjacent walls of the piston recess respectively for resisting rotation of the piston.

3. In a shock absorber having a casing providing a cylinder, the combination with an operating cam oscillatably supported in the casing; of a piston in said cylinder, having a rectangular recess for receiving the cam, two of the opposite sides of the recess being provided with wear resisting buttons engaged by the cam for reciprocating the piston; and yieldable means secured to the piston by a button and having portions extending into the space between and engaging the side of the cam and the adjacent wall of the piston recess for preventing rotation of the piston.

4. In a shock absorber having a casing providing a cylinder, the combination with an operating cam oscillatably supported in the casing; of a piston in said cylinder, having a rectangular recess for receiving the cam, two of the opposite sides of the recess being provided with wear resisting buttons engaged by the cam for reciprocating the piston; and a spring member secured to the piston by one of the buttons and having two arm portions each, one of which extends into the space between a piston recess wall and the adjacent surface of the cam, said arm portions engaging both piston and cam for preventing rotation of the piston.

5. In a shock absorber having a casing providing a cylinder, the combination with an operating cam oscillatably supported in the casing; of a piston in said cylinder, having a rectangular recess for receiving the cam, two of the opposite sides of the recess being provided with wear resisting buttons engaged by the cam for reciprocating the piston; and a spring member secured to the piston by one of the buttons and having two arm portions each, one of which extends into the space between a piston recess wall and the adjacent surface of the cam, each arm having two substantially flat and an intermediate curved portion, the former engaging the wall of the piston recess, the curved portion engaging the adjacent cam surface for preventing rotation of the piston.

RALPH I. BATES.